United States Patent [19]

Kobayashi et al.

[11] Patent Number: 5,094,926

[45] Date of Patent: Mar. 10, 1992

[54] ELECTRIC POWER PRODUCING SYSTEM USING MOLTEN CARBONATE TYPE FUEL CELL

[75] Inventors: Kazunori Kobayashi, Yokohama; Toshiaki Yoshida, Tachikawa, both of Japan

[73] Assignee: Ishikawajima-Harima Heavy Industries Co., Ltd., Chiyoda, Japan

[21] Appl. No.: 518,568

[22] Filed: May 3, 1990

[51] Int. Cl.$^5$ ............................................. H01M 8/06
[52] U.S. Cl. ........................................ 429/20; 429/17
[58] Field of Search ................................. 429/17, 20

[56] References Cited

U.S. PATENT DOCUMENTS

| | | | |
|---|---|---|---|
| 3,321,333 | 5/1967 | Palmer | 429/20 |
| 4,128,700 | 5/1978 | Sederquist | 429/20 X |
| 4,333,992 | 6/1982 | Healy | 429/17 |
| 4,678,723 | 7/1987 | Wertheim | 429/20 X |
| 4,743,517 | 5/1988 | Cohen et al. | 429/20 X |

*Primary Examiner*—Stephen J. Kalafut
*Attorney, Agent, or Firm*—Trexler, Bushnell, Giangiorgi & Blackstone, Ltd.

[57] ABSTRACT

An electric power producing system using a molten carbonate type fuel cell, comprises a fuel cell whose anode chamber is provided with hydrogen gas and whose cathode chamber is provided with air and carbon dioxide and a reformer including a reforming chamber for reforming fuel gas into anode gas and a combustion chamber for maintaining reforming chamber temperature. In the reformer, fuel gas and steam are fed into the reforming chamber, gases discharged from the anode chamber are introduced into the combustion chamber and non-reacted gases in the anode exhaust gas are burned with air, and heat produced upon the combustion is used to heat the reforming chamber. Hydrogen-rich gas made in the reforming chamber is fed into the anode chamber, air is introduced into the cathode chamber, the cathode exhaust gas is partially fed into the combustion chamber whereas the remainder is discharged from the system, and combustion gas from the combustion chamber is separated from water and then recirculated into the cathode chamber. The anode exhaust gas and cathode exhaust gas are directly introduced into the combustion chamber so that the anode and cathode chambers are made substantially equal to each other in pressure.

18 Claims, 2 Drawing Sheets

5,094,926

ELECTRIC POWER PRODUCING SYSTEM USING MOLTEN CARBONATE TYPE FUEL CELL

BACKGROUND OF THE INVENTION

1. Technical Field

The present invention relates to an electric power producing system using molten carbonate type fuel cell, and particularly relates to such a system whose differential pressure between cathode and anode chambers is made small.

2. Background Art

Fuel cell produces electricity and water at the same time through a chemical reaction of hydrogen of fuel and oxygen of air, which reaction is a reversal reaction of electrodialysis of water. Generally a fuel cell comprises an electrolyte plate, an air electrode (cathode electrode) and a fuel electrode (anode electrode), and the electrolyte plate is sandwiched between these two electrodes. As the fuel gas such as hydrogen is fed to the anode and the air containing carbon dioxide is fed to the cathode, the above-mentioned chemical reaction occurs to produce electric potential difference (or electric power) between the cathode and the anode. The power generation system also comprises a reformer which includes a reforming chamber and a combustion chamber. The fuel gas such as natural gas (NG) is reformed to a hydrogen-rich gas through the reformer. The fuel gas reacts with steam in the reforming chamber to be reformed to hydrogen gas and carbon monoxide gas. The reforming chamber is heated by heat form the combustion chamber in which fuel gas and air undergo combustion.

Referring to FIG. 2 of the accompanying drawings, which illustrates a conventional power generation system using molten carbonate type fuel cells, numeral 1 denotes the fuel cell, 2 denotes the anode chamber, 3 denotes the cathode chamber, 4 denotes the reformer, 5 denotes the reforming chamber and 6 the combustion chamber.

The fuel gas 7 such as NG is preheated by a fuel preheater 8 and desulfurized by a desulfurizer 9. Then, the fuel gas 7 is led into an ejector 10 and further into the reforming chamber 5 of the reformer 4 with steam 11. Water is changed to the steam 11 through an evaporator (preheater) 12 and a superheater 13 and introduced to the ejector 10. Then, the steam 11 goes to the reforming chamber 5 of the reformer 4 with the fuel gas 7, in which the fuel gas 7 and the steam 11 are reformed to hydrogen-rich gas, and then introduced into the anode chamber 2 of the fuel cell 1. Gases from the anode chamber 2 (called "anode exhaust gas") is about 700 degrees C (°C.) in temperature and contains non-reacted hydrogen. Therefore, the condensate is separated from the anode exhaust gas by a separator 18 via a first heat exchanger 14, a fuel preheater 8, a second heat exchanger 15, a heater 16 and a condenser 17. After that, the anode exhaust gas is fed into the combustion chamber 6 of the reformer 4, as the fuel, via the second heat exchanger 15 and the first heat exchanger 17 by a blower 19. The temperature of the anode exhaust gas fed into the combustion chamber 6 is about 500 degrees C.

Air 20 is fed into an air preheater 22 by the blower 21 and preheated by part of gases discharged from the cathode chamber 3. Then, part of the air 20 is fed into the cathode chamber 3 whereas the remainder is fed into the combustion chamber 6 of the reformer 4. Non-reacted hydrogen contained in the anode exhaust gas is combusted in the combustion chamber 6 and combustion heat thereupon helps maintain the reforming reaction of the fuel gas 7 with the steam 11 in the reforming chamber 5. Combustion flue gas such as carbon dioxide is supplied to the cathode chamber 3.

Fuel used in the reformer 4 is the anode exhaust gas which is discharged from the anode chamber 2 and contains hydrogen. Entire hydrogen is not consumed in the anode chamber 2. This fuel gas is condensed in the condenser 17 and separated from water in the separator 18 before going to the combustion chamber 6 of the reformer 4. The air 20 which is preheated by the air preheater 22 and fed into the combustion chamber 6 is used in combustion of hydrogen contained in the anode exhaust gas. This combustion maintains the reaction temperature in the reforming chamber 5 of the reformer 4 at about 750 degrees C.

In the above-described conventional power generation system using fuel cell, however, the electrolyte migration and depletion may occur when the pressure difference between the anode and cathode chambers raises over a certain value since the electrolyte of the fuel cell is the molten carbonate. If the electrolyte depletion occurs, the power generation is no longer expected. In order to overcome this problem, or in order to maintain the pressure difference within a decent range, the pressure difference between anode gas and cathode gas have to be controlled. However, it is difficult to control this pressure difference since the anode exhaust gas is introduced to the combustion chamber of the reformer via several devices such as a heat exchanger and the cathode exhaust gas is also discharged through devices such as a heat exchanger.

SUMMARY OF THE INVENTION

One object of the present invention is to provide a power generation system using molten carbonate type fuel cell whose pressure difference of the anode and cathode chambers is maintained within a suitable range without controlling the pressure difference of entrance and exit of the anode and cathode chambers.

Another object of the present invention is to compensate the pressure of the anode and cathode chambers and to recover discharged heat of great amount produced in the system.

According to one aspect of the present invention, there is provided an electric power producing system with a molten carbonate type fuel cell, comprising:

a molten carbonate type fuel cell whose anode chamber is provided with hydrogen gas and whose cathode chamber is provided with air and carbon dioxide to cause power generation; and a reformer including a reforming chamber for reforming fuel gas into anode gas and a combustion chamber for maintaining reforming temperature of the reforming chamber, in which reformer fuel gas and steam is fed into the reforming chamber, gases discharged from the anode chamber (anode exhaust gas) are introduced into the combustion chamber and non-reacted gases in the anode exhaust gas are burned with air, and heat produced upon the combustion is used to heat the reforming chamber.

characterized in that the fuel gas is fed to the reforming chamber of the reforming device with steam, hydrogen-rich gas made in the reforming chamber is fed into the anode chamber of the molten carbonate type fuel cell, air is introduced into the cathode chamber of the fuel cell, the anode exhaust gas is fed into the combustion chamber of the reformer, the cathode exhaust gas is partially fed into the combustion chamber whereas the remainder is discharged from the system, and combustion gas from the combustion chamber is separated from water and then recirculated into the cathode chamber.

According to another aspect of the present invention, there is provided an electric power producing system with a molten carbonate type fuel cell, comprising:

a molten carbonate type fuel cell whose electrolyte is sandwiched by anode and cathode, the anode having an anode chamber through which hydrogen gas is fed to the anode and the cathode having a cathode chamber through which air and carbon dioxide are fed to the cathode to cause power generation; and a reformer including a reforming chamber for reforming fuel gas with steam into anode gas and a combustion chamber for maintaining reforming temperature of the reforming chamber, characterized in that the system further includes:

a fuel feed line for feeding the fuel gas to the reforming chamber of the reformer;

a steam feed line for feeding the steam into the fuel feed line;

an anode gas feed line for feeding the anode gas reformed in the reforming chamber into the anode chamber;

a cathode gas feed line for feeding the cathode gas into the cathode chamber;

air feed means for introducing air into the cathode gas feed line;

an anode exhaust gas line connecting the anode chamber with the combustion chamber for introducing the anode exhaust gas into the combustion chamber;

a cathode exhaust gas line connecting the cathode chamber with the combustion chamber for feeding the cathode exhaust gas into the combustion chamber;

a cathode exhaust gas discharge line branched from the cathode exhaust gas line for discharging part of the cathode exhaust gas out of the system; and a recycle line connecting the combustion chamber with the cathode gas feed line for recirculating the combustion gas into the cathode gas feed line.

In the power generation system of the present invention, gases from the anode chamber (anode exhaust gas) and gases from the cathode chamber (cathode exhaust gas) are respectively and directly introduced into the combustion chamber so that the anode and cathode chambers are made equal in pressure, i.e., the pressure in two chambers is compensated. Also, gases discharged from the combustion chamber (combustion gas) is separated from water and heat-recovered, and further recirculated as the cathode gas so that exhaust heat is effectively recovered.

DESCRIPTION OF THE PREFERRED EMBODIMENTS

Now a preferred embodiment of the present invention will be explained with reference to FIG. 1.

Figure 1:
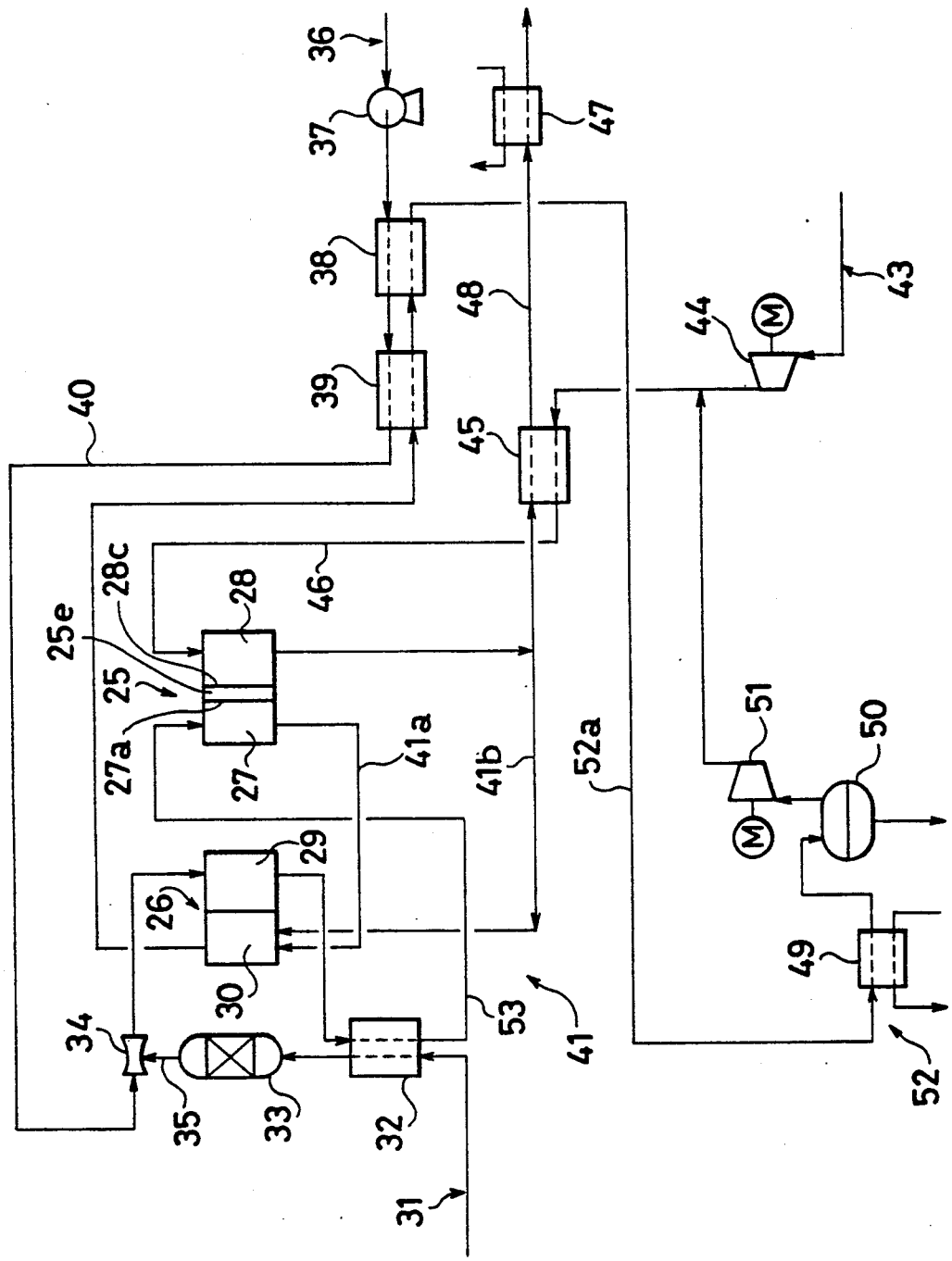
FIG. 1 is a block diagram showing one embodiment of the electric power-producing molten carbonate type fuel cell system of the present invention.
Figure 2:
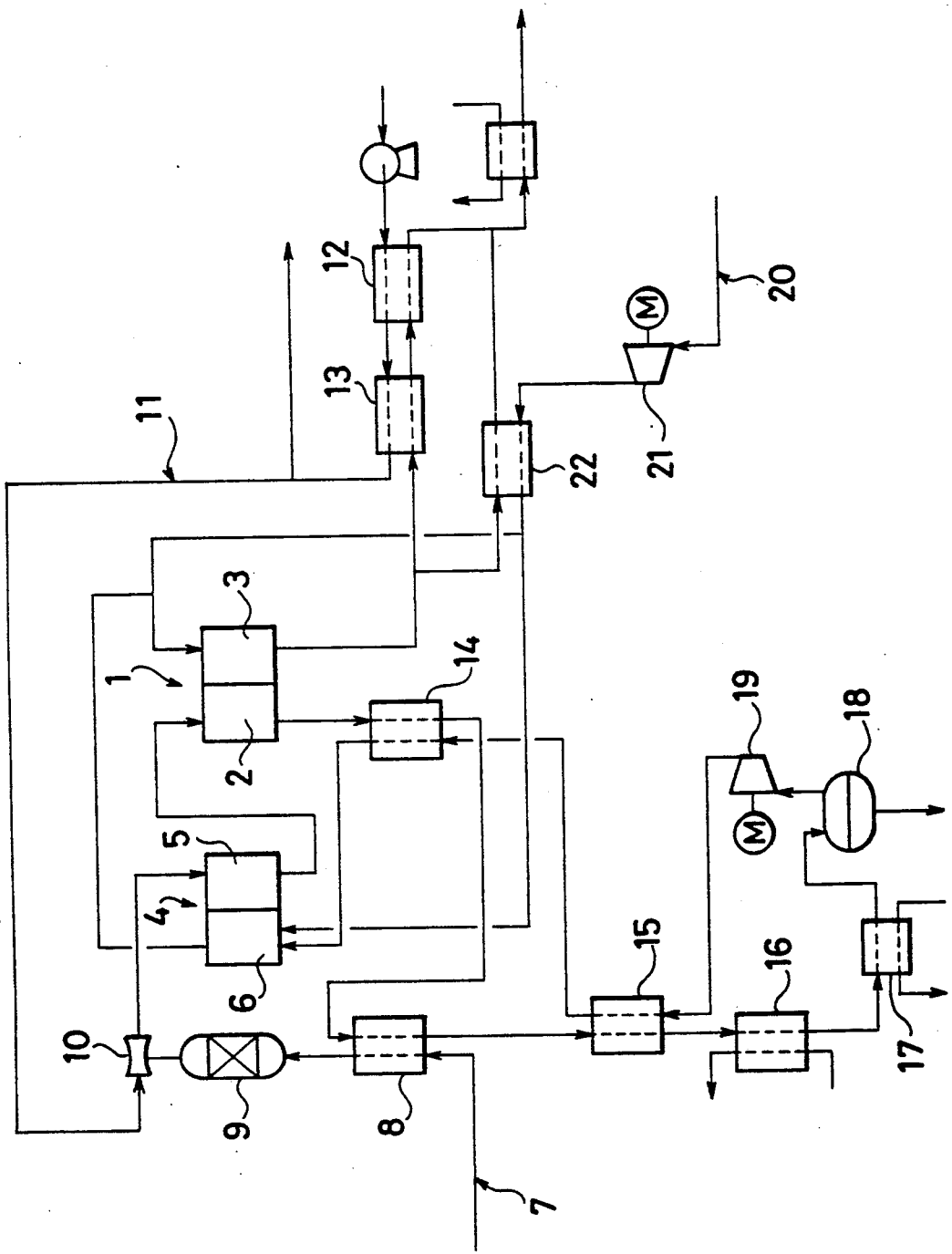
FIG. 2 is a block diagram showing a prior art power generation system using molten carbonate type fuel cell.

In FIG. 1, a fuel cell 25 and a reformer 26 are idential to those illustrated in FIG. 2 and described in the "Background Art" of this specification. The fuel cell 25 includes an electrolyte 25e, a porous anode 27a and a porous cathode 28c. The andoe 27a and cathode 28c sandwiches the electrolyte 25e at respective one faces thereof, and the anode 27a is provided with an anode chamber 27 at the other face thereof and the cathode 28c is provided with a cathode chamber at the other face thereof. The reformer 26 includes a reforming chamber 29 and a combustion chamber 30. Reforming catalyst is provided in the reforming chamber 29 and combustion catalyst is provided in the combustion chamber 30.

Fuel gas 31 such as NG is fed through a fuel gas feed line 35 into to the reforming chamber 29 of the reformer 26 via a fuel gas preheater 32, a desulfurizer 33 and an ejector 34. Water 36 is fed through a steam feed line 40 to be vaporized by a evaporator 38 and a superheater 39 and then fed into the reforming chamber 29 of the reformer 26 via an ejector 34.

Hydrogen-rich gases discharged from the reforming chamber 29 of the reformer 26 is supplied into the anode chamber 27 of the fuel cell 25 via the fuel gas preheater 32. Gases discharged from the anode 27 (anode exhaust gas) are introduced to the combustion chamber 30 of the reformer 26 through an anode exhaust gas line 41a which is one of the pressure compensating line 41.

Air 43 is fed into the cathode chamber 28 via an air preheater 45 by a blower 44 through a cathode gas feed line 46. Part of gases discharged from the cathode 28 (cathode exhaust gas) is led to the combustion chamber 30 of the reformer 26 through the other line 41b of the pressure compensating line 41. Other exhaust gases are expelled through an exhaust gas line 48 via the air preheater 45 and a heat exchanger 47.

Gases burned in the combustion chamber 30 of the reformer 26 are recirculated through a combustion exhaust gas line 52a to the cathode gas feed line 46 upstream of the air preheater 45, via the superheater 39 and evaporator 38, a condenser 49 and a separator 50 by the blower 51. The combustion exhaust gas line 52a is a main line of a recirculation line 52.

Water 36 is forced into the evaporator 38 and preheater 39 by a pump 37 and combustion exhaust gas from the combustion chamber 30 of the reformer 26 is also forced thereto, such that water 36 is vaporized to steam. The fuel gas 31 such as NG is in turn preheated by the fuel gas preheater 32, desulfurized by the desulfurizer 33, led into the ejector 34 and introduced into the reforming chamber 29 of the reformer 26 with the steam.

In the reforming chamber 29, the fuel gas 31 and the steam 36 are reformed to hydrogen-rich gas and carbon monoxide, and then preheated by the preheater 32 before being led into the anode chamber 27 of the fuel cell 25. The anode exhaust gas discharged from the anode chamber 27 which contains non-reacted hydrogen gas is directly introduced to the combustion chamber 30 of the reformer 26 via the anode exhaust gas line 41a with a temperature (about 700 degrees C.) being maintained.

Meantime, air 43 is forced into the air preheater by the air blower 44 and preheated by part of the cathode exhaust gas from the cathode chamber 28 of the fuel cell 25 before being fed to the cathode. Part of the cathode exhaust gas from the cathode 28 having a high temperature (about 700 degrees C.) is fed to the combustion chamber 30 of the reformer 26 via the cathode exhaust gas line 41b. In this manner, exhaust gases from the anode chamber 27 and cathode chamber 30 are directly led into the combustion chamber 30 of the reformer 26 respectively. Therefore, the anode exhaust gas and cathode exhaust gas compensate the pressure of the counterpart each other via the combustion chamber 40. As a result, the electrode pressure difference between the anode chamber 27 and cathode chamber 28 becomes substantially zero.

Hydrogen gas contained in the anode exhaust gas is burned in the combustion chamber 30 and the combustion heat maintains the temperature of the reforming chamber 29 at a predetermined value (about 750 degrees C.) such that the fuel gas 31 and steam 36 flowing through the reforming chamber 29 undergo the reforming reaction.

Combustion exhaust gases such as carbon dioxide are condensed by the condenser 49 via the superheater 39 and evaporator 38 on the steam line 40, and then condensed water is separated by the separator 50. After that, those gases are returned to the cathode 28c via the cathode feed line 46 by the blower 51. Then, reaction between hydrogen and oxygen occurs in the fuel cell 25 via the electrolyte 25e to produce electric power.

Gases from the anode chamber 27 and cathode chamber 28 are directly introduced to the combustion chamber 30 of the reformer 26 via the pressure compensating line 41, i.e., the combustion chamber 40 is connected to the anode chamber 27 and cathode chamber 29. Therefore, the combustion chamber 30 compensates the pressure of the anode chamber 27 and cathode chamber 28 without controlling electrode pressure difference at the entrances and exits of the anode and cathode chambers 27 and 28. In another word, the pressure difference between the anode and cathode can be maintained in a certain adequately small range.

In addition, the anode exhaust gas which contains non-reacted hydrogen is used as the fuel to the combustion chamber 30 and this gas is directly fed into the combustion chamber 30. Therefore, difference between the anode exhaust gas temperature (about 700 degrees C.) and the reforming reaction temperature (about 750 degrees C.) of the reforming chamber 29 is small and the anode exhaust gas is burned by the high temperature cathode exhaust gas (about 700 degrees C.). Thus, a large amount of non-reacted hydrogen is not necessary to maintain the temperature of the reforming chamber 29. In comparison with the prior art system, the required amount of non-reacted hydrogen is made smaller, which results in higher fuel utilization efficiency and higher power generation efficiency.

Furthermore, the combustion gas from the combustion chamber 30, which contains carbon dioxide and other gases, is a high temperature gas which contains not only the steam produced in the anode 27a but also the steam produced upon combustion of the non-reacted hydrogen contained in the anode exhaust gas. Hence, a large amount of heat is recovered from the exhaust gases when the water is condensed and separated therefrom.

We claim:

1. An electric power producing system using molten carbonate fuel cell, comprising:

a molten carbonate fuel cell including an anode chamber and a cathode chamber, air and carbon dioxide being fed to the cathode chamber to cause power generation; and a reformer including a reforming chamber for reforming fuel gas into anode gas and a combustion chamber for maintaining a reforming reaction temperature of the reforming chamber, fuel gas and steam being fed into the reforming chamber to reform them into hydrogen-rich gas, gases discharged from the anode chamber being introduced into the combustion chamber and non-reacted gases in the gases discharged from the anode chamber being burned with air, and heat produced upon the combustion being used to heat the reforming chamber, characterized in that the fuel gas is fed to the reforming chamber of the reformer with steam, hydrogen-rich gas made in the reforming chamber is fed into the anode chamber of the molten carbonate fuel cell, air is introduced into the cathode chamber of the molten carbonate fuel cell, gases from the anode chamber are directly fed into the combustion chamber of the reformer, a portion of gases from the cathode chamber is directly fed into the combustion chamber whereas the remainder is discharged from the system so that there is no substantial pressure difference between the anode chamber and the cathode chamber and heat of the gases from the anode and cathode chambers is used for reactions in the reformer, and gases from the combustion chamber are recirculated into the cathode chamber so that exhaust heat of the gases from the combustion chamber of the reformer is recovered.

2. The electric power producing system of claim 1, wherein the fuel gas is preheated by the hydrogen-rich gas, sulfurized and then fed into to the reforming chamber with the steam.

3. The electric power producing system of claim 1, wherein water is heated to steam by the gases discharged from the combustion chamber, and then fed into the reforming chamber.

4. The electric power producing system of claim 3, wherein the gases discharged from the combustion chamber, after heating the water, is cooled such that water contained therein is condensed, and the gases are recirculated with air to the cathode chamber after being separated from the water.

5. The electric power producing system of claim 4, wherein the air and recirculated gases are preheated by gases discharged from the cathode chamber to outside of the system and then recirculated to the cathode chamber.

6. The electric power producing system of claim 1, wherein the gases discharged from the anode chamber contain non-reacted hydrogen and the non-reacted hydrogen is burned in the combustion chamber with air contained in the gases discharged from the cathode chamber, and combustion in the combustion chamber heats the reforming chamber to maintain the reforming reaction temperature in the reforming chamber.

7. The electric power producing system of claim 1, wherein gas pressure in the anode chamber and gas pressure in the cathode chamber are made equal to each other by directly feeding into the combustion chamber the gases discharged from the anode chamber and the gases discharged from the cathode chamber such that pressure difference between the anode chamber and the cathode chamber is compensated.

8. An electric power producing system using molten carbonate fuel cell, comprising:

a molten carbonate fuel cell including an electrolyte, an anode and a cathode, the electrolyte being sandwiched by the anode and cathode, the anode being provided with an anode chamber through which hydrogen gas is fed to the anode and the cathode being provided with a cathode chamber through which air and carbon dioxide are fed to the cathode; and a reformer including a reforming chamber for reforming fuel gas with steam into anode gas and a combustion chamber for maintaining a reforming reaction temperature of the reforming chamber, characterized in that the system further comprises:

a fuel feed line for feeding the fuel gas to the reforming chamber of the reformer;

a steam feed line for feeding the steam into the fuel feed line;

an anode gas feed line for feeding the anode gas made in the reforming chamber into the anode chamber;

a cathode gas feed line for feeding cathode gas into the cathode chamber;

air feed means for introducing air into the cathode gas feed line;

an anode exhaust gas line connecting the anode chamber with the combustion chamber for introducing the gases discharged from the anode chamber with the combustion chamber directly;

a cathode exhaust gas line connecting the cathode chamber with the combustion chamber for feeding part of the gases discharged from the cathode chamber into the combustion chamber directly;

a cathode exhaust gas discharge line branched from the cathode exhaust gas line for discharging part of the gases discharged from the cathode chamber out of the system; and a recycle line connecting the combustion chamber with the cathode gas feed line for recirculating gases discharged from the combustion chamber into the cathode gas feed line, whereby there is no substantial pressure difference between the anode chamber and the cathode chamber, heat of the gases from the anode and cathode chambers is used for reactions in the reformer and exhaust heat of the gases from the combustion chamber of the reformer is recovered.

9. The electric power producing system of claim 8, wherein a preheater is connected to the fuel feed line and the anode gas feed line for heat exchanging the fuel gas and the reformed gas.

10. The electric power producing system of claim 9, wherein a desulfurizer is connected to the fuel feed line.

11. The electric power producing system of claim 8, wherein the steam feed line is connected to a water feed line, and a heat exchanger through which the gases discharged from the combustion chamber to be recirculated flow is connected to the water feed line so that water supplied through the water feed line is changed to steam.

12. The electric power producing system of claim 8, wherein an ejector is connected to the fuel feed line and the ejector is connected to the steam feed line such that the fuel gas is mixed with the steam in the ejector and fed to the reformer.

13. The electric power producing system of claim 8, wherein the anode exhaust gas line is communicated with the cathode exhaust gas line via the combustion chamber such that pressure difference between the anode chamber and cathode chamber is compensated.

14. The electric power producing system of claim 8, wherein the recycle line includes a cooling device for condensing the steam contained in the gases discharged from the combustion chamber and further includes a gas-liquid separating device for separating the condensed water from the gases.

15. The electric power producing system of claim 11, wherein the cooling device includes a heat exchanger for heating the water supplied into steam.

16. The electric power producing system of claim 14, wherein the gases whose moisture has been removed by the gas-liquid separating device are recirculated into the cathode gas feed line by a blower.

17. An electric power producing system using a molten carbonate fuel cell, comprising:

a molten carbonate fuel cell including an anode chamber and a cathode chamber, air and carbon dioxide being fed to the cathode chamber to cause power generation; and a reformer including a reforming chamber for reforming fuel gas into anode gas and a combustion chamber for maintaining a reforming reaction temperature of the reforming chamber, fuel gas and steam being fed into the reforming chamber to reform them into hydrogen-rich gas, gases discharged from the anode chamber being introduced into the combustion chamber and non-reacted gases in the gases discharged from the anode chamber being burned with air, and heat produced upon the combustion being used to heat the reforming chamber, characterized in that the fuel gas is fed to the reforming chamber of the reformer with steam, hydrogen-rich gas made in the reforming chamber is fed into the anode chamber of the molten carbonate fuel cell, air is introduced into the cathode chamber of the molten carbonate fuel cell, gases from the anode chamber are directly fed into the combustion chamber of the reformer, a portion of gases from the cathode chamber is directly fed into the combustion chamber whereas the remainder is discharged from the system so that there is no substantial pressure difference between the anode chamber and the cathode chamber, and gases from the combustion chamber are recirculated into the cathode chamber.

18. An electric power producing system using a molten carbonate fuel cell, comprising:

a molten carbonate fuel cell including an electrolyte, an anode and a cathode, the electrolyte being sandwiched by the anode and cathode, the anode being provided with an anode chamber through which hydrogen gas is fed to the anode and the cathode being provided with a cathode chamber through which air and carbon dioxide are fed to the cathode; and a reformer including a reforming chamber for reforming fuel gas with steam into anode gas and a combustion chamber for maintaining a reforming reaction temperature of the reforming chamber, characterized in that the system further comprises:

a fuel feed line for feeding the fuel gas to the reforming chamber of the reformer;

a steam feed line for feeding the steam into the fuel feed line;

an anode gas feed line for feeding the anode gas made in the reforming chamber into the anode chamber;

a cathode gas feed line for feeding cathode gas into the cathode chamber;

air feed means for introducing air into the cathode gas feed line;

an anode exhaust gas line connecting the anode chamber with the combustion chamber for introducing the gases discharged from the anode chamber into the combustion chamber directly;

a cathode exhaust gas line connecting the cathode chamber with the combustion chamber for feeding part of the gases discharged from the cathode chamber into the combustion chamber directly;

a cathode exhaust gas discharge line branched from the cathode exhaust gas line for discharging part of the gases discharged from the cathode chamber out of the system; and a recycle line connecting the combustion chamber with the cathode gas feed line for recirculating gases discharged from the combustion chamber into the cathode gas feed line, whereby there is no substantial pressure difference between the anode chamber and the cathode chamber.

* * * * *